(12) United States Patent
Kim et al.

(10) Patent No.: US 8,837,406 B2
(45) Date of Patent: Sep. 16, 2014

(54) TRANSMIT POWER CONTROL METHOD AND APPARATUS

(75) Inventors: Soeng Hun Kim, Yongin-si (KR); Sang Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 13/401,096

(22) Filed: Feb. 21, 2012

(65) Prior Publication Data

US 2012/0213172 A1   Aug. 23, 2012

Related U.S. Application Data

(60) Provisional application No. 61/444,844, filed on Feb. 21, 2011.

(30) Foreign Application Priority Data

Feb. 10, 2012  (KR) .......... 10-2012-0013941

(51) Int. Cl.
| | |
|---|---|
| H04W 4/00 | (2009.01) |
| H04W 52/36 | (2009.01) |
| H04W 52/28 | (2009.01) |
| H04W 52/14 | (2009.01) |
| H04W 52/22 | (2009.01) |
| H04W 52/34 | (2009.01) |

(52) U.S. Cl.
CPC .......... *H04W 52/146* (2013.01); *H04W 52/367* (2013.01); *H04W 52/286* (2013.01); *H04W 52/228* (2013.01); *Y02B 60/50* (2013.01); *H04W 52/346* (2013.01)

USPC .............. 370/329; 370/431; 455/69; 455/522

(58) Field of Classification Search
CPC ..... H04W 52/04; H04W 52/08; H04W 52/10; H04W 52/143; H04W 52/146; H04W 52/38; H04W 72/0473; H04W 52/22; H04W 52/226
USPC ............. 370/329, 431; 455/69, 450–509, 522
See application file for complete search history.

(56) References Cited

U.S. PATENT DOCUMENTS

| 7,167,718 B2 | 1/2007 | Hayashi et al. |
| 2005/0281219 A1 | 12/2005 | Kim et al. |
| 2006/0003787 A1* | 1/2006 | Heo et al. ...................... 455/522 |

FOREIGN PATENT DOCUMENTS

| JP | 2002-217828 A | 8/2002 |
| KR | 10-2005-0119619 A | 12/2005 |

* cited by examiner

*Primary Examiner* — Mark Rinehart
*Assistant Examiner* — Mang Yeung
(74) *Attorney, Agent, or Firm* — Jefferson IP Law, LLP

(57) ABSTRACT

A method and apparatus for controlling transmit power of a User Equipment (UE) in a mobile communication system is provided. The transmit power control method of the present invention includes determining, when the terminal's required transmit power exceeds the terminal's maximum transmit power, whether a plurality of Hybrid Automatic Repeat reQuest (HARQ) processes are running and reducing, when the plurality of HARQ processes are running, a transmit power of at least one of the plurality of HARQ processes which has not experienced transmit power reduction previously. The UE transmit power control method and apparatus of the present invention is advantageous to control the transmit power in transmit power reduction mode.

12 Claims, 7 Drawing Sheets

TRANSMIT POWER CONTROL METHOD AND APPARATUS

PRIORITY

This application claims the benefit under 35 U.S.C. §119(e) of a U.S. Provisional application filed on Feb. 21, 2011 in the U.S. Patent and Trademark Office and assigned Ser. No. 61/444,844, and under 35 U.S.C. §119(a) of a Korean patent application filed on Feb. 10, 2012 in the Korean Intellectual Property Office and assigned Serial No. 10-2012-0013941, the entire disclosure of each of which is hereby incorporated by reference.

BACKGROUND OF THE INVENTION

1. Field of the Invention

The present invention relates to a method and apparatus for controlling a User Equipment (UE) in a mobile communication system. More particularly, the present invention relates to a method and apparatus for controlling transmit power of a UE in a mobile communication system.

2. Description of the Related Art

Mobile communication systems were initially developed to provide a subscriber with a voice communication service while the user was on the move. With advances in communication technologies, the mobile communication systems have evolved to support high speed data communication services as well as the standard voice communication services.

The Long Term Evolution (LTE) standard, which is standardized by the 3rd Generation Partnership Project (3GPP), is an example of a next generation mobile communication system. The LTE standard is designed to provide for a downlink speed of up to 100 Mbps. In order to fulfill the requirements for an LTE system, studies have been done of various aspects including minimization of the number of involved nodes in the connections and placing the radio protocol closer to the radio channels.

Unlike the standard voice service, most data services are allocated resources according to the amount of data to be transmitted and according to a channel condition. Accordingly, in a wireless communication system such as a cellular communication system, it is important to manage resource allocation based on the resource scheduled for data transmission, the channel condition, and the amount of data to be transmitted. The importance of resource allocation management is also applicable in the LTE system. As such, in the LTE system, a base station scheduler manages and assigns radio resources based on the above considerations.

More recent studies have focused on the LTE-Advanced (LTE-A) standard, which improves the data rate with the adaptation of several new techniques. In the LTE-A system, the Specific Absorption Rate (SAR) requirement for controlling the influence of microwaves to the human body below a predetermined level is applied strictly. Accordingly, the UE's transmit power is limited to meet the SAR requirement. Furthermore, in order to prevent multiple communication modules from interfering with each other, it is also considered to reduce the UE transmit power for the LTE-A communication module. There is therefore a need of a method and apparatus for controlling a UE's transmit power efficiently in consideration of an uplink channel and a Hybrid Automatic Repeat reQuest (HARQ) process.

SUMMARY OF THE INVENTION

Aspects of the present invention are to address at least the above-mentioned problems and/or disadvantages and to provide at least the advantages described below. Accordingly, an aspect of the present invention is to provide a method and apparatus for controlling a User Equipment (UE) transmit power efficiently in a transmit power reduction mode.

In accordance with an aspect of the present invention, a transmit power control method of a terminal is provided. The method includes determining, when the terminal's required transmit power exceeds the terminal's maximum transmit power, whether a plurality of Hybrid Automatic Repeat reQuest (HARQ) processes are running, and reducing, when the plurality of HARQ processes are running, a transmit power of at least one of the plurality of HARQ processes which has not experienced transmit power reduction previously.

In accordance with another aspect of the present invention, a terminal for controlling transmit power is provided. The terminal includes a controller for determining, when the terminal's required transmit power exceeds the terminal's maximum transmit power, whether a plurality of HARQ processes are running and reduces, when the plurality of HARQ processes are running, a transmit power of at least one of the plurality of HARQ processes which has not experienced transmit power reduction previously.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for controlling a User Equipment's (UE's) transmit power efficiently.

The UE's transmit power can be affected by several external factors. The Specific Absorption Rate (SAR) requirement and inter-communication module requirement are representative examples. The SAR requirement reduces the UE's transmit power to reduce the influence of electromagnetic waves from the UE to the human body below a predetermined level. Typically, mobile devices are equipped with multiple communication modules including Wireless Local Area Network (WLAN), Bluetooth, and Long Term Evolution (LTE) modules. In order to mitigate interference among these built-in communication modules, research has been conducted under the In-Device Coexistence (IDC) concept in the LTE standard. For example, by reducing the LTE transmission signal power in Bluetooth reception mode, it is possible to reduce the amount of interference of an LTE transmission signal to the Bluetooth communication.

In order to determine how the SAR requirement reduces the maximum transmit power, it is useful to examine the process for determining a UE's maximum transmit power.

Figure 1:
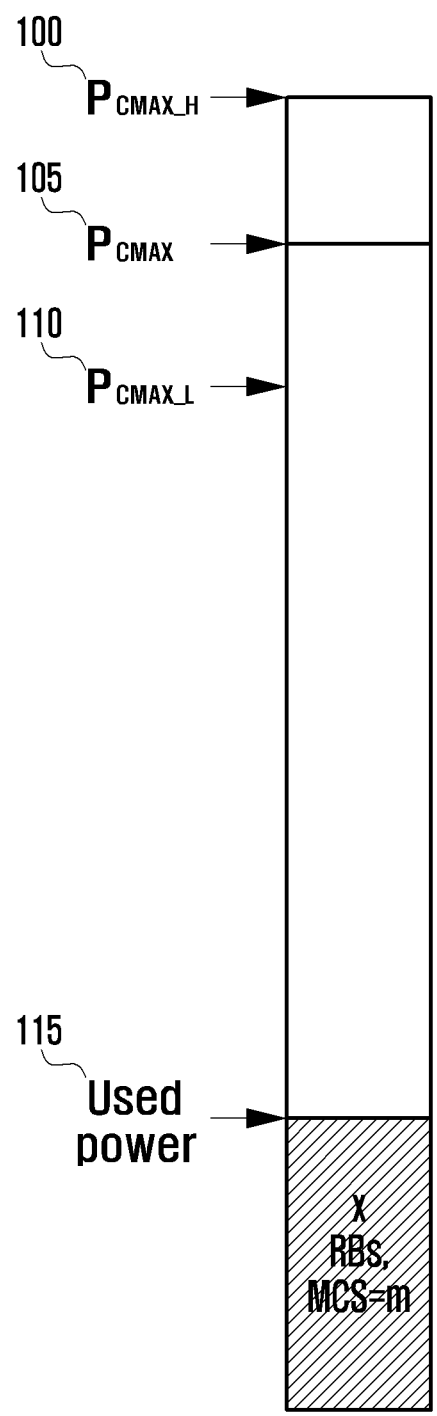
FIG. 1 is a diagram illustrating a configuration of transmit power of a User Equipment (UE) according to an exemplary embodiment of the present invention.

FIG. 1 is a diagram illustrating a configuration of transmit power of a UE according to an exemplary embodiment of the present invention.

Referring to FIG. 1, the maximum UE transmit power $P_{CMAX}$ 105 is set to a value between the $P_{CMAX\_H}$ and $P_{CMAX\_L}$ based on the parameters provided by the evolved Node B (eNB) and predefined parameters of Equations (1)-(3):

$$P_{CMAX\_L} \leq P_{CMAX} \leq P_{CMAX\_H} \quad (1)$$

where the upper bound $P_{CMAX\_H}$ 100 and the lower bound $P_{CMAX\_L}$ 110 are defined as follows:

$$P_{CMAX\_L} = \text{MIN}\{P_{EMAX} - TC, P_{PowerClass} - \text{MAX}(\text{MPR} + \text{A-MPR}, P\text{-MPR}) - TC\} \quad (2),$$

$$P_{CMAX\_H} = \text{MIN}\{P_{EMAX}, P_{PowerClass}\} \quad (3)$$

where $P_{EMAX}$ is a maximum allowed UE transmit power which is transmitted from the eNB to the UE in System Information Block 1 (SIB1) as broadcast information. $P_{PowerClass}$ is a nominal UE power. $P_{CMAX\_H}$ is defined as the minimum between $P_{EMAX}$ and $P_{PowerClass}$. Meanwhile, $P_{CMAX\_L}$ is somewhat complex. $P_{CMAX\_L}$ is influenced by Maximum Power Reduction (MPR)+Additional-MPR (A-MPR) and P-MPR. $\Delta T_C$, MPR, and A-MPR are parameters for defining the ceiling value to adjust the maximum UE transmit power in the serving cell such that the unintended radiation or interference to an adjacent channel meet a predetermined requirement.

MPR is the value determined according to the amount of transmission resources allocated to the UE and the modulation scheme. A-MPR is the value determined according to an uplink frequency band, geographical characteristics, and an uplink transmission bandwidth. A-MPR is used for the case in which a frequency band is particularly sensitive to ambient spurious radiation. $\Delta T_C$ is the parameter for allowing additional transmit power adjustment in a case where uplink transmission is performed at an edge of the frequency band. If uplink transmission is performed on the lowest 4 MHz or the highest 4 MHz of a certain frequency band, the UE sets $\Delta T_C$ to 1.5 dB and, otherwise, sets $\Delta T_C$ to 0. P-MPR is a maximum power reduction value applied for satisfying the SAR requirement and determined in consideration of the distance between the device and the body of the user. For example, if the distance between the device and user's body is short, the total transmit power value of the UE should be reduced and, for this, a high value of P-MPR is applied. In contrast, if the distance between the device and the user's body is long, it is tolerable to increase the total transmit power value of the device such that P-MPR is set to a low value. The used transmit power 115 is determined for a Resource Block (RB) and a Modulation and Coding Scheme (MCS) allocated for the corresponding UE and can exceed the maximum UE transmit power $P_{CMAX}$ 105.

In IDC, which is still under development, it is expected to reduce the transmit power in a similar manner to the reduction of the maximum UE transmit power with P-MPR according to the SAR requirement.

Figure 2:
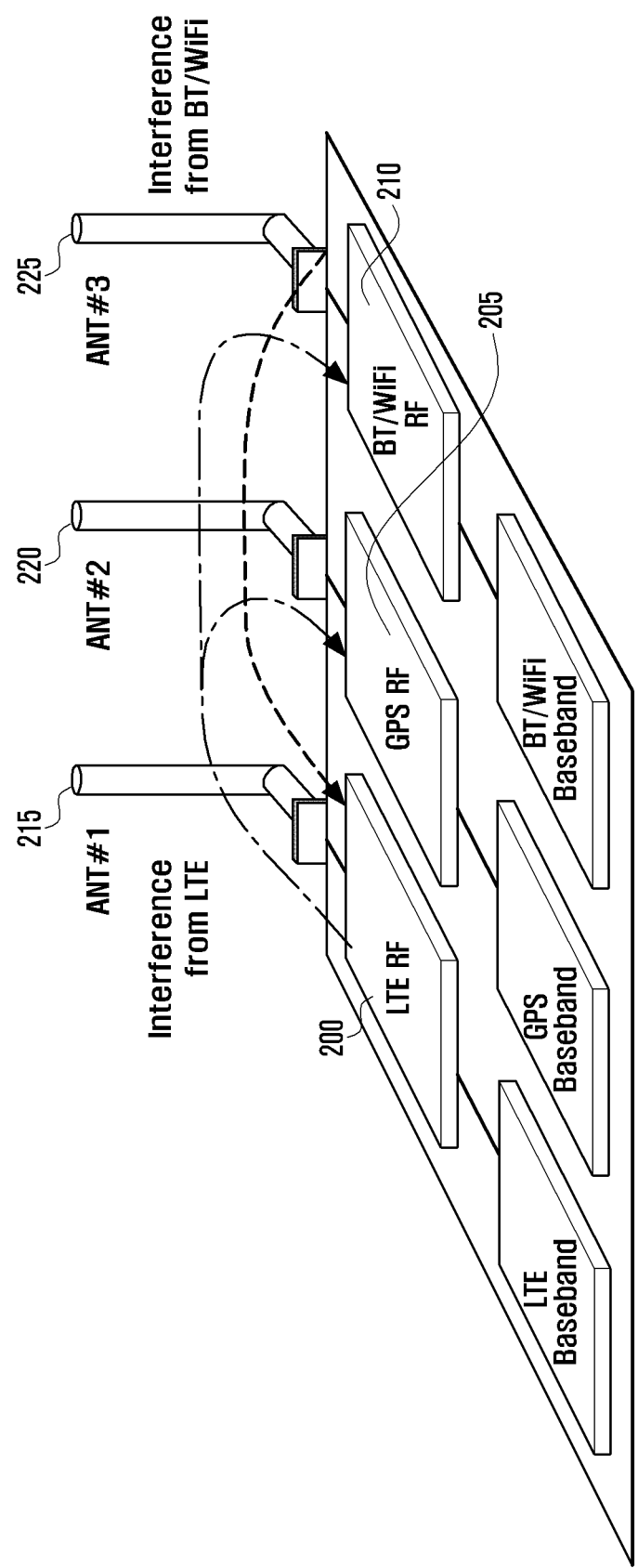
FIG. 2 is a perspective view illustrating a device equipped with multiple communication modules according to an exemplary embodiment of the present invention.

FIG. 2 is a perspective view illustrating a device equipped with multiple communication modules according to an exemplary embodiment of the present invention.

Referring to FIG. 2, recent mobile devices are equipped with multiple communication modules for supporting diversified functions. The communication modules can include an LTE module 200, a Global Positioning System (GPS) module 205, and a short range wireless communication module 210 such as Bluetooth and Wide Local Area Network (WLAN). These communication modules transmit/receive data through corresponding antennas 215, 220 and 225. Although the communication systems operate on different frequency bands, the communication modules of the systems operating on the contiguous frequency bands are likely to interfere with each other. This is because it is impossible to entirely separate the signals transmitted/received on the frequency bands. Also, since the communication modules and antennas are placed in the space-restricted mobile device, they are arranged in close proximity. As a consequence, interference among the communication modules cannot be ignored. In order to mitigate such in-device interference, is it necessary to control the transmit powers of the communication modules. For example, the transmission signal of the LTE communication module 200 can cause interference with data reception of the short range communication module 210 such as a Bluetooth/WiFi module. In order to mitigate the interference, the maximum transmit power of the LTE communication module may be reduced.

In order to meet the SAR requirement or the IDC requirement, control of the transmit power is a key issue of an LTE UE. Since the UE can control the power allocation for data and control signals on the Physical Uplink Shared CHannel (PUSCH) and the Physical Uplink Control CHannel (PUCCH) respectively, especially in consideration of HARQ processes, a method is needed for controlling the UE transmit power efficiently in consideration of these complex factors.

The PUSCH and the PUCCH are data transmission and control signaling channels, respectively. Accordingly, a transmission error on the PUCCH can cause significant problems. Accordingly, when the UE faces a situation requiring transmit power reduction, it is preferred to reduce the power allocated to the PUSCH first. However, if such a situation takes place while only the PUCCH is used, it may be necessary to reduce the transmit power of the PUCCH. Even when reducing the transmit power of the PUSCH, it may decrease performance degradation to reduce the transmit power per HARQ process.

The HARQ process adopted for the LTE standard is a Stop-And-Wait (SAW) protocol in which a subsequent transmission can take place only after receiving ACKnowledge/Non-ACKnowledge (ACK/NACK) for the previous data transmission. This causes a waste of radio resources for Round Trip Time (RTT). In order to reduce any waste of radio resources and improve resource efficiency, multiple HARQ processes may operate. The LTE standard supports up to 8 HARQ processes that are identified by a 3-bit HARQ process ID.

Figure 3:
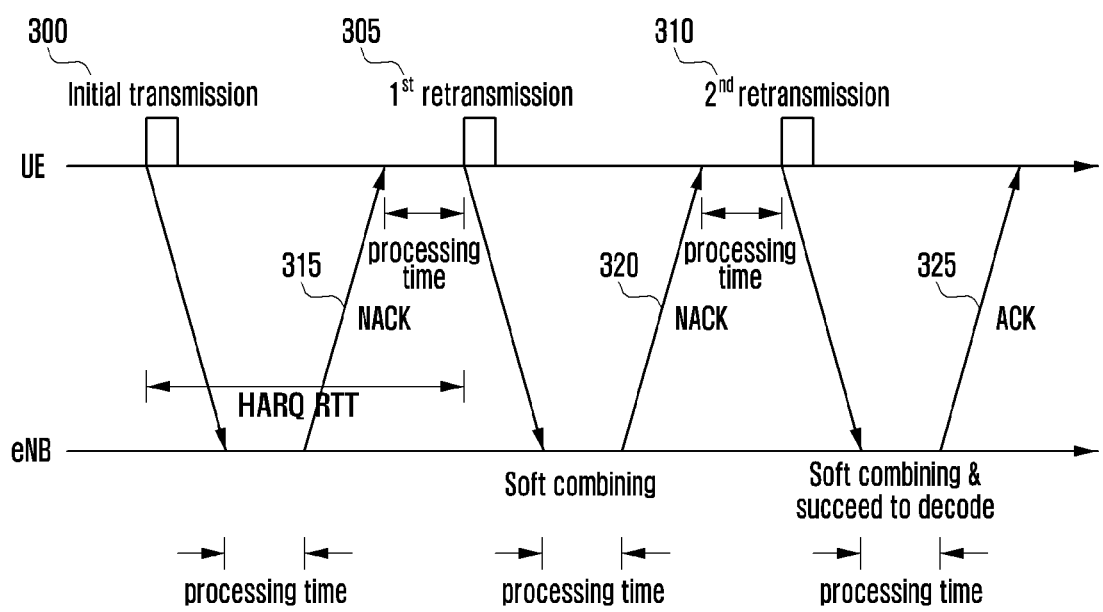
FIG. 3 is a diagram illustrating a principle of an uplink Hybrid Automatic Repeat reQuest (HARQ) process in a Long Term Evolution (LTE) system according to an exemplary embodiment of the present invention.

FIG. 3 is a diagram illustrating a principle of an uplink HARQ process in an LTE system according to an exemplary embodiment of the present invention.

Referring to FIG. 3, the UE attempts initial transmission 300 of a Media Access Control Protocol Data Unit (MAC PDU). If the packet is received, the eNB consumes a certain amount of processing time to determine whether the packet is decoded successfully. If the decoding fails, the eNB transmits NACK 315 to the UE. If the NACK 315 is received, the UE attempts retransmission 305. Typically, the time between the previous packet transmission and next retransmission is defined as HARQ RTT. In FIG. 3, it is shown that the uplink radio resource is wasted. In order to reduce the waste of radio resources, another HARQ process is activated for the HARQ RTT. If the retransmitted packet 305 is received, the eNB performs soft combining of the retransmitted packet 305 with the previously received packet. That is, by accumulating the previously received packet energy and the currently received packet energy, it is possible to increase the probability of a successful decoding process. If decoding fails again, the eNB transmits NACK 320 to the UE. Upon receipt of the NACK 320, the UE attempts second retransmission 310. The eNB performs soft combining and, if decoding is successful, transmits ACK 325 to the UE.

The HARQ process operates with soft-combining such that the energy accumulates for every retransmission. In case that the transmit power is reduced for transmission of the PUSCH, it is likely that multiple HARQ processes are running in the UE. Accordingly, the packet decoding performance degradation can be alleviated by decreasing the transmit power with power distribution to several HARQ processes rather than decreasing power for every retransmission.

Figure 4:
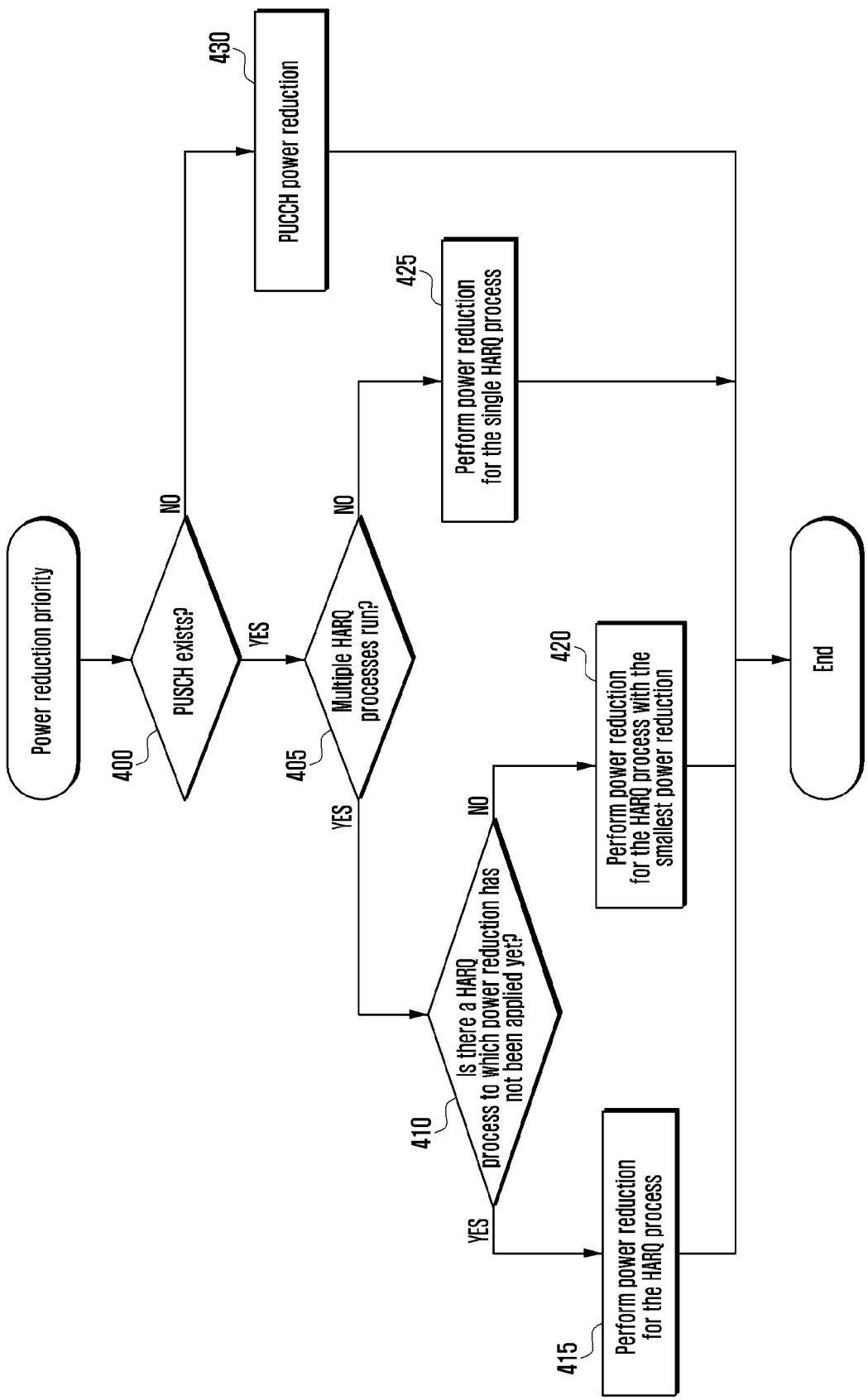
FIG. 4 is a flowchart illustrating an uplink transmit power control method according to an exemplary embodiment of the present invention.

FIG. 4 is a flowchart illustrating an uplink transmit power control method according to an exemplary embodiment of the present invention.

Referring to FIG. 4, if it is required to reduce UE transmit power, the UE determines whether PUSCH is in use at step 400. If no PUSCH is in use, the UE reduces the transmit power of PUCCH to a certain level to meet the requirement in step 430. Otherwise, if PUSCH is in use, the UE attempts transmit power reduction on PUSCH. More specifically, the UE determines whether multiple HARQ processes are running on PUSCH at step 405. If it is determined that only one HARQ process is running, the UE performs transmit power reduction in the corresponding HARQ process at step 425. On the other hand, if the data are transmitted on multiple HARQ processes simultaneously in carrier aggregation mode, the UE determines whether there is a HARQ process to which the transmit power reduction has never been applied at step 410. For reference, whether the transmit power reduction has been applied in a certain process is a proposition restricted to MAC PDU transmission. That is, if no transmit power reduction is applied in a certain process for a certain MAC PDU, the UE determines that the transmit power reduction has not been applied in the corresponding process. If there is a HARQ process to which the transmit power reduction has never been applied, the UE reduces the transmit power in the corresponding HARQ process first at step 415. That is, the UE reduces the transmit power of PUSCH carrying the MAC PDU in the corresponding process first. Otherwise, if there is no HARQ process to which the transmit power reduction has never been applied, the UE reduces the transmit power in the process having the least accumulated power reduction amount for the MAC PDUs being transmitted at the corresponding time point first at step 420. To sum up, the UE performs power reduction according to the following order in multiple LTE uplink transmission:

Reduce the transmit power of the PUSCH in the HARQ process to which no transmit power reduction has been applied yet.

Reduce the transmit power of the PUSCH in the HARQ having the least power reduction amount.

PUCCH power reduction

Figure 5:
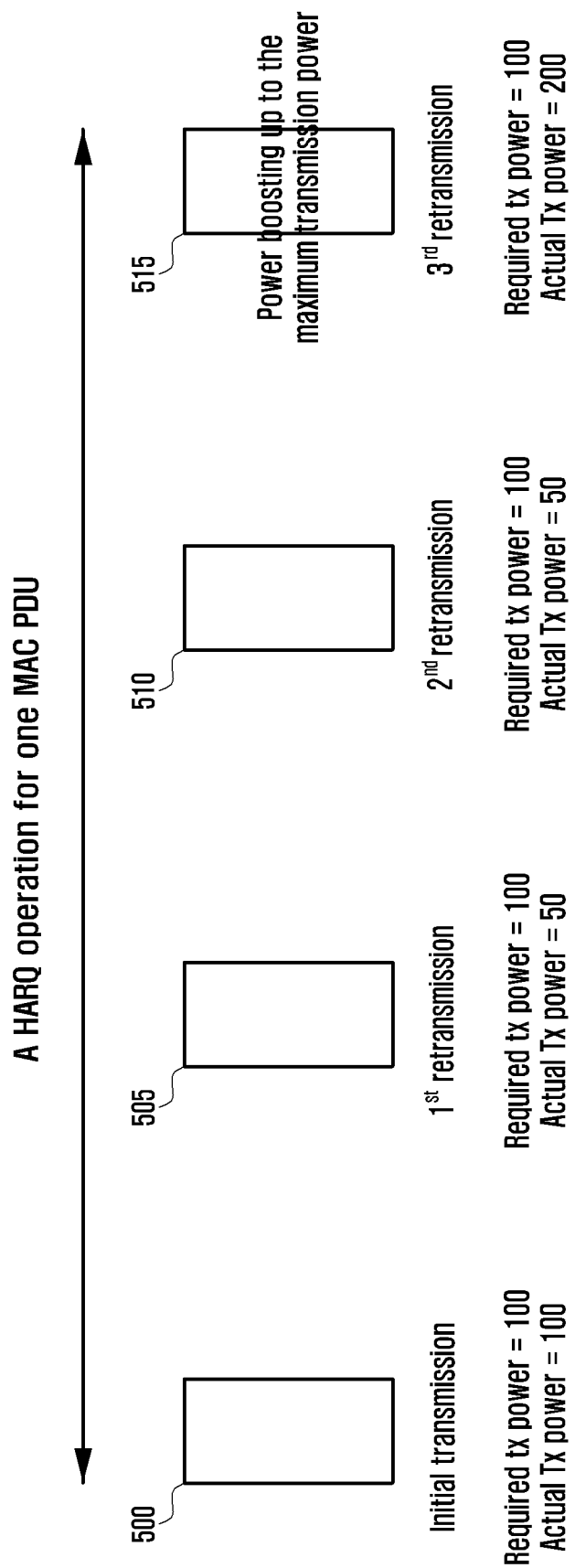
FIG. 5 is a flowchart illustrating a HARQ process with transmit power reduction according to an exemplary embodiment of the present invention.

FIG. 5 is a flowchart illustrating a HARQ process with transmit power reduction according to an exemplary embodiment of the present invention.

Referring to FIG. 5, if the required UE power is 100 in initial transmission 500, the data are transmitted with the actual transmit power of 100 without transmit power reduction. However, if the eNB fails decoding, the UE performs a first retransmission 505. The first retransmission 505 is attempted with the reduced transmit power 50. The UE records the reduced power of 50. If the eNB fails decoding again, the UE performs the second retransmission 510. At this time, the transmit power is 50 with the power reduction. The UE records the accumulated power reduction of 100 obtained by summing the power reductions of the first and second retransmissions. If the second retransmission fails, the UE performs a third retransmission 515. At this time, if the transmit power reduction is released, the UE performs the third retransmission at the transmit power of 200 obtained by summing the total power reduction amount 100 and the required transmit power 100. However, if the sum of the total power reduction amount and required power is greater than the maximum transmit power, the UE sets the UE transmit power to match with the maximum transmit power and transmits the data at the UE transmit power.

Figure 6:
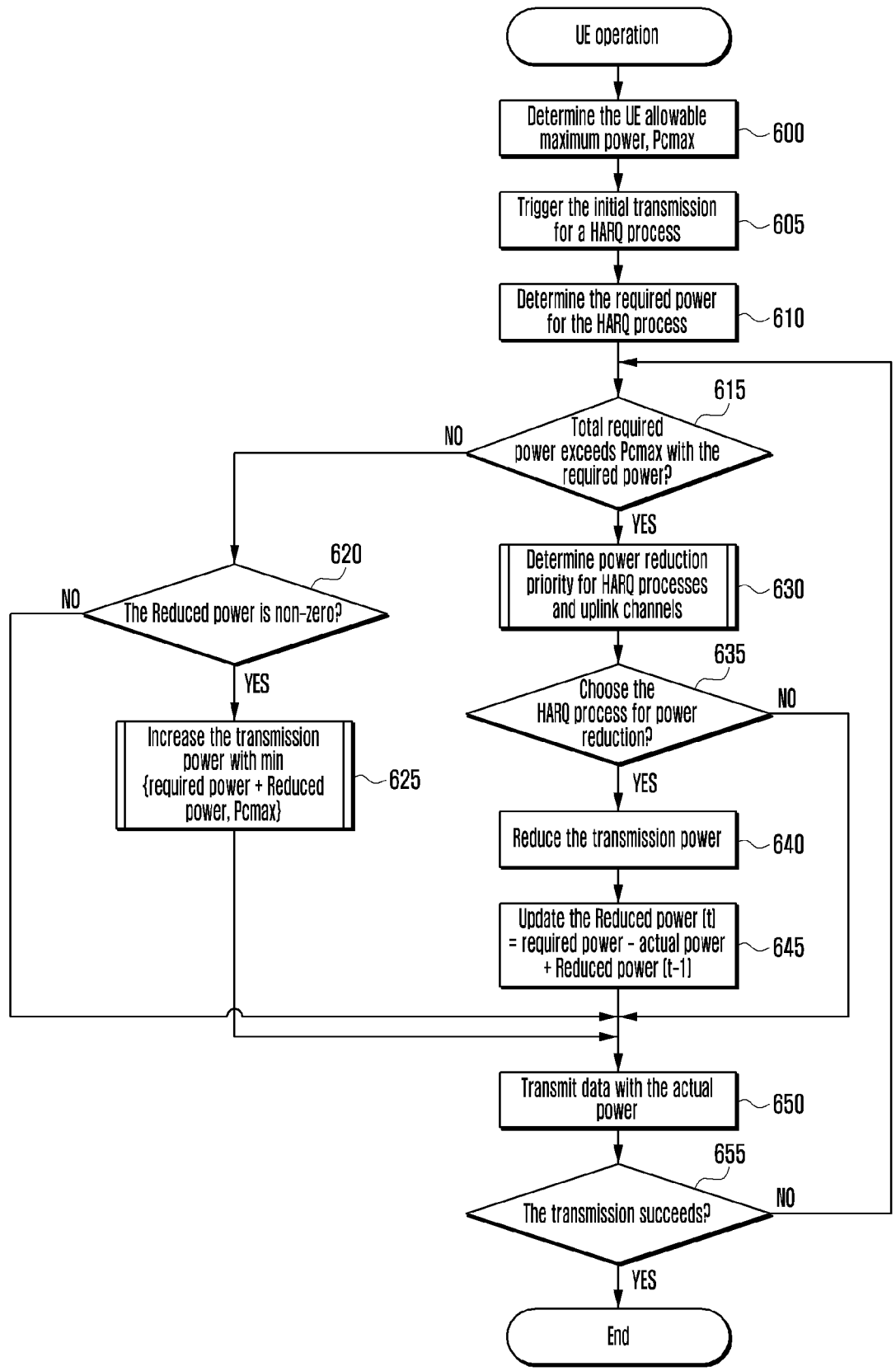
FIG. 6 is a flowchart illustrating a HARQ process according to an exemplary embodiment of the present invention.

FIG. 6 is a flowchart illustrating a HARQ process according to an exemplary embodiment of the present invention.

Referring to FIG. 6, the UE determines maximum UE transmit power $P_{CMAX}$ in consideration of the SAR requirement and/or IDC requirement at step 600. The UE cannot use more power than the maximum UE transmit power. The UE starts initial transmission in a certain HARQ process at step 605. The UE determines the required power for the HARQ process at step 610. The UE determines if the total required transmit power including the transmit power allocated for the corresponding HARQ process exceeds the maximum UE transmit power $P_{CMAX}$ at step 615. If the total required transmit power does not exceed $P_{CMAX}$, the UE determines whether there is any reduced power according to the power reduction in the corresponding HARQ process at step 620. Since there is no power reduction in the initial transmission, the data transmission is performed with the required transmit power in the initial transmission. In case of retransmission, there can be the reduced power according to the power reduction in the previous transmissions. In this case the UE sets the UE transmit power to the sum of the recoded total reduction power and the required transmit power at step 625 and transmits the data at the UE transmit power at step 650. If the sum of the total reduction power and the required transmit power exceeds $P_{CMAX}$, the UE sets the UE transmit power to $P_{CMAX}$. If the total required transmit power exceeds $P_{CMAX}$ at step 615, the UE determines the channel and HARQ process to which the power reduction is applied at step 630. An exemplary method to determine the channel and HARQ process to which the power reduction is applied has been described above with reference to FIG. 4. If a HARQ process is selected for the transmit power reduction at step 635, the UE reduces the transmit power as much as necessary at step 640. The UE records the reduced power amount in an accumulative manner at step 645. The UE transmits data at the determined transmit power at step 650. Afterward, the UE determines whether the transmission is successful at step 655 and, if eNB fails decoding, the UE performs the retransmission process from step 615.

Figure 7:
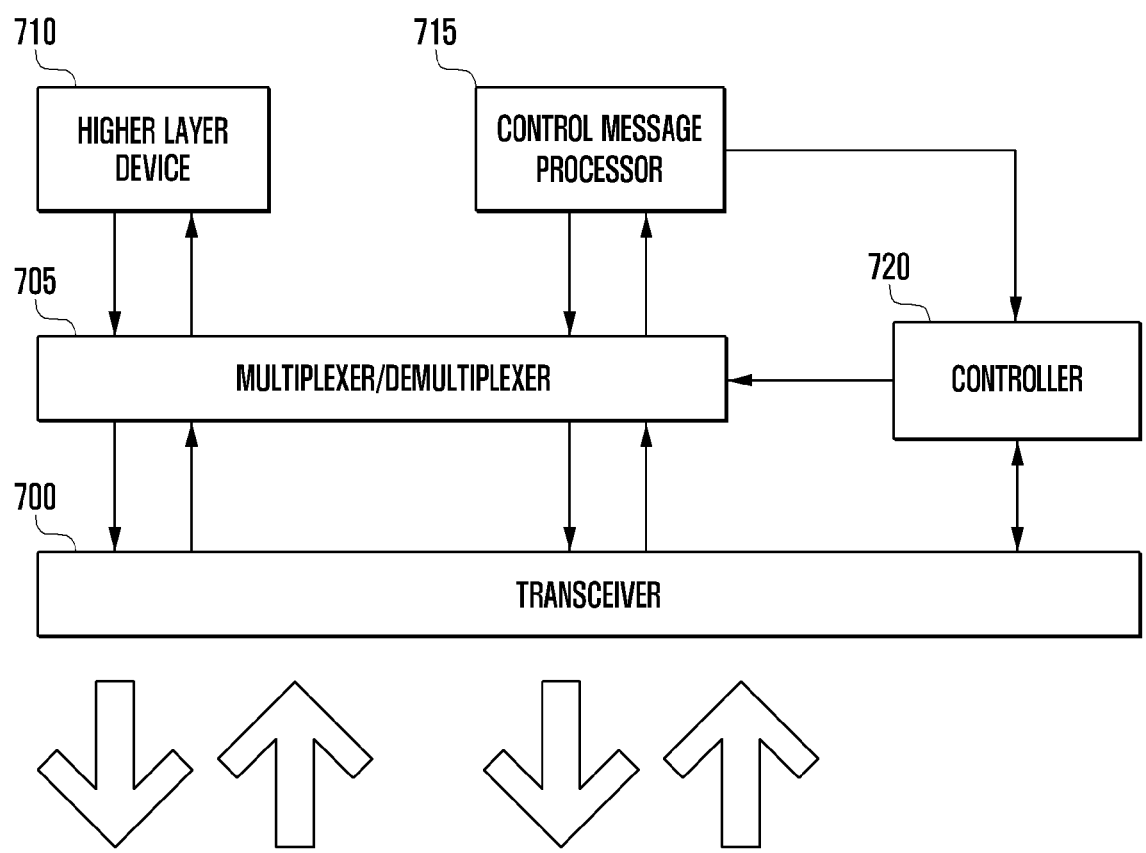
FIG. 7 is a block diagram illustrating a configuration of a UE according to an exemplary embodiment of the present invention.

FIG. 7 is a block diagram illustrating a configuration of a UE according to an exemplary embodiment of the present invention.

Referring to FIG. 7, the UE includes a transceiver 700, a multiplexer/demultiplexer 705, a higher layer device 710, a control message processor 715, and a controller 720.

The UE transmits/receives data generated by the higher layer device 710 and control messages generated by the control message processor 715. When transmitting a control signal and/or data to the eNB, the UE multiplexes the control signal and/or data by means of the multiplexer/demultiplexer 705 under the control of the controller 720. The controller 720 can control transmit power according to the above-described exemplary embodiments. In contrast, when receiving a control signal and/or data, the UE receives the control signal and/or data by means of the transceiver 700, demultiplexes the received signal by means of the multiplexer/demultiplexer 705, and sends the demultiplexed signal to the higher layer device 710 or the control message processor 715.

As described above, the UE transmit power control method and apparatus of exemplary embodiments of the present invention is advantageous to control the transmit power in transmit power reduction mode.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmit power control method of a terminal, the method comprising:
   determining, if a required transmit power of the terminal exceeds a maximum transmit power of the terminal, whether a plurality of Hybrid Automatic Repeat reQuest (HARQ) processes are running, wherein each of the plurality of HARQ processes is an independent HARQ process managing HARQ packets;
   selecting, if the plurality of HARQ processes are running, at least one of the plurality of HARQ processes which has not experienced transmit power reduction previously and reducing a transmit power of the selected at least one HARQ process; and
   reducing, if each of the plurality of HARQ processes has previously experienced a transmit power reduction the transmit power of one of the plurality of HARQ processes that has experienced the fewest number of previous power reductions.

2. The method of claim 1, further comprising increasing, if the terminal's required transmit power does not exceed the terminal's maximum transmit power, the transmit power of the one of the plurality of HARQ processes that has experienced the fewest number of previous power reductions.

3. The method of claim 2, further comprising accumulating an amount of the transmit power reduction of each of the plurality of HARQ processes that has previously experienced the transmit power reduction,
   wherein the increasing comprises incrementing the transmit power of the one of the plurality of HARQ processes that has experienced the fewest number of previous power reductions based on the amount of the accumulated power reduction in the corresponding HARQ process.

4. The method of claim 2, further comprising accumulating an amount of the transmit power reduction of each of the plurality of HARQ processes that has previously experienced the transmit power reduction,
   wherein the increasing comprises incrementing the transmit power of the one of the plurality of HARQ processes that has experienced the fewest number of previous power reductions as much as a sum of the amount of the accumulated power reduction and a required power of the corresponding process.

5. The method of claim 1, further comprising reducing, if the terminal's required transmit power is greater than the terminal's maximum transmit power and a single HARQ process is running, the transmit power of the single HARQ process.

6. The method of claim 1, further comprising reducing, if the terminal's required transmit power is greater than the terminal's maximum transmit power and no uplink data channel to be transmitted exists, the transmit power of an uplink control channel.

7. A terminal for controlling transmit power, the terminal comprising: a controller for determining, if a required transmit power of the terminal exceeds a maximum transmit power of the terminal, whether a plurality of Hybrid Automatic Repeat reQuest (HARQ) processes are running, wherein each of the plurality of HARQ processes is an independent HARQ process managing HARQ packets, and for selecting, if the plurality of HARQ processes are running, at least one of the plurality of HARQ processes which has not experienced transmit power reduction previously and reducing a transmit power of the selected at least one HARQ process, wherein the controller reduces, if each of the plurality of HARQ processes has previously experienced a transmit power reduction, the transmit power of one of the plurality of HARQ process that has experienced the fewest number of previous power reductions.

8. The terminal of claim 7, wherein the controller increases, if the terminal's required transmit power does not exceed the terminal's maximum transmit power, the transmit power of the one of the plurality of HARQ processes that has experienced the fewest number of previous power reductions.

9. The terminal of claim 8, wherein the controller accumulates an amount of the transmit power reduction of each of the plurality of HARQ processes that had previously experienced the transmit power reduction and increases the transmit power of the one of the plurality of HARQ processes that has experienced the fewest number of previous power reductions based on the amount of the accumulated power reduction in the corresponding HARQ process.

10. The terminal of claim 8, wherein the controller accumulates an amount of the transmit power reduction of each of the plurality of HARQ processes that had previously experienced the transmit power reduction and increases the transmit power of the one of the plurality of HARQ processes that has experienced the fewest number of previous power reductions as much as sum of the amount of the accumulated power reduction and a required power of the corresponding process.

11. The terminal of claim 7, wherein the controller reduces, if the terminal's required transmit power is greater than the terminal's maximum transmit power and a single HARQ process is running, the transmit power of the single HARQ process.

12. The terminal of claim 7, wherein the controller reduces, if the terminal's required transmit power is greater than the terminal's maximum transmit power and no uplink data channel to be transmitted exists, the transmit power of an uplink control channel.

* * * * *